Oct. 3, 1944.  A. E. KROGH  2,359,651
CONTROL SYSTEM
Filed Jan. 16, 1942   2 Sheets-Sheet 1

INVENTOR.
ANKER E. KROGH
BY C. E. Spangenberg
ATTORNEY

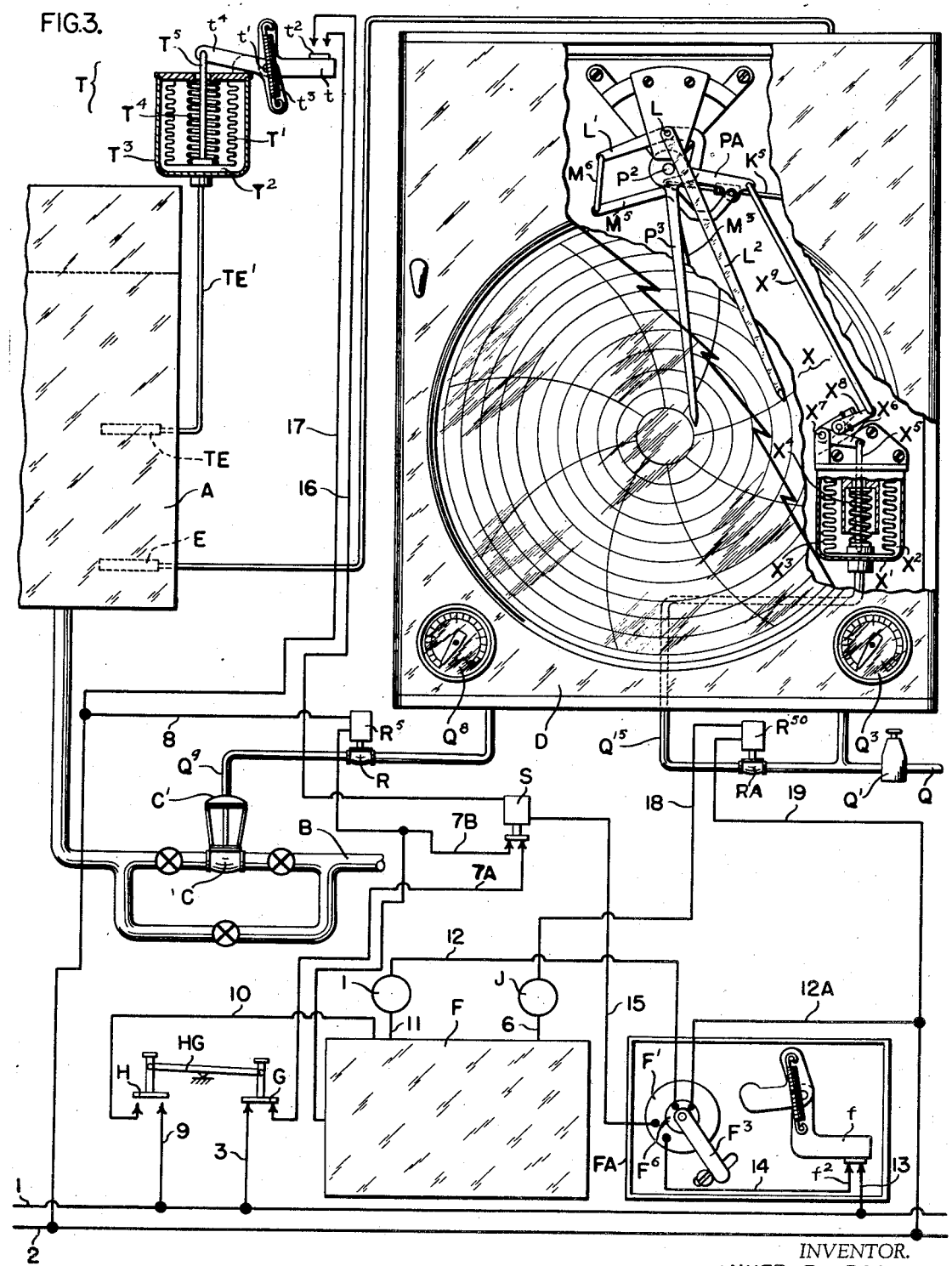

Patented Oct. 3, 1944

2,359,651

UNITED STATES PATENT OFFICE 2,359,651

CONTROL SYSTEM

Anker E. Krogh, Mount Airy, Pa., assignor to The Brown Instrument Company, Philadelphia, Pa., a corporation of Pennsylvania Application January 16, 1942, Serial No. 427,028

6 Claims. (Cl. 236—46)

The general object of the present invention is to provide improved apparatus for use in cooking size supplied to cotton and rayon slashing machines of textile mills. More specifically stated, the general object of the invention is to provide improved apparatus for automatically controlling the temperature of the size during the cooking operation, and the duration of that operation, and for automatically maintaining the cooked size at a predetermined temperature lower than the cooking temperature during a variable period in which the cooked size is held in storage in the vessel in which it has been cooked. The use of the cooking vessel as a storage receptacle for cooked size, saves the cost of special storage provisions, saves in plant floor space, and saves heat otherwise lost when cooked starch is transferred from the cooker to a separate storage receptacle.

In a simple and desirable form of the present invention, I employ an air operated recording thermometer which includes remote index setting provisions and which is of known commercial type, to close and open a valve supplying the steam used in heating the size cooking vessel in automatic response to the temperature of the size as the latter rises above and returns to the predetermined cooking temperature. The steam valve thus opened and closed by the thermometer may well be a diaphragm valve of commercial type, comprising a motor or diaphragm chamber to which the thermometer air control provisions supply air under pressure to open the valve, and alternatively permit air to escape from said chamber to close the valve.

With the above described thermometer and steam supply valve, I combine a cooking timer, which may well be of known type, and which operates to terminate the cooking operation at the end of a predetermined cooking time which may be varied by the adjustment of the timer. The timer thus terminates the cooking period by operating through the remote index setting provisions to so adjust the control thermometer that the latter will thereafter operate to mainain a suitable size storage temperature of 170° or so, instead of the previously maintained size cooking temperature of 208° or so. In the preferred practical form of the invention, the timer energizes a venting solenoid valve of commercial type, which, when energized, closes communication between the air control provisions of the thermometer and the diaphragm chamber of the steam supply valve, and opens the last mentioned chamber to the atmosphere. Advantageously, the above described apparatus includes simple push button or analogous control means for initiating each batch size cooking operation, and for resetting the timer following its interruption of one cooking operation and preparatory to the initiation of a succeeding size cooking operation.

The above described simple size heating apparatus has numerous important practical advantages. For one thing, it includes a relatively small number of control instrumentalities, all of which may be of relatively simple and inexpensive commercial types. A record of the size temperature variations occurring during a plurality of successive cooking operations during a single 24 hour day, may be recorded on a single 24 hour disc chart of the recording thermometer. The simple on and off control of the steam supply to the size cooker permits of a suitably close control of the size temperature during the cooking operation, in consequence of the very considerable heat storage capacity of the size cooker and the size therein. The automatic control of the size cooking temperature, and of the cooking period duration, eliminates "boiling-over," insures desirably uniform starch solutions, eliminates risk of undercooking or overcooking the starch, and avoids waste of steam in the size cooking operation. Moreover, the required control instrumentalities are relatively simple in operation, easy to adjust and easy to maintain in operative condition.

In cooking thick boiling starch, it is necessary, or at least desirable, to bring the starch up to a temperature of 180° or so, which is somewhat below the full cooking temperature, during an initial period of the cooking operation, and to then maintain the starch temperature without material change during a period of fifteen minutes or so to permit the beneficent action of enzymes. This interruption in the rise of the size temperature may be effected in accordance with the present invention by adding to the simple apparatus hereinbefore referred to, a second timing device which is automatically actuated when the size attains the enzyme action temperature of 180° to prevent the supply of steam to the cooker during an enzyme action period of fifteen minutes or so. The means for thus maintaining the size at a suitable storage temperature may obviously be used with, or without, the delayed rise timer, which, as previously described, is advantageously employed in cooking heavy starch.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have diagrammatically illustrated and described various embodiments of my invention.

Of the drawings:

Fig. 3 is a diagrammatic representation of a form of the invention including means for temporarily interrupting the rise in the size temperature during an early stage of the cooking operation.

Figure 1:
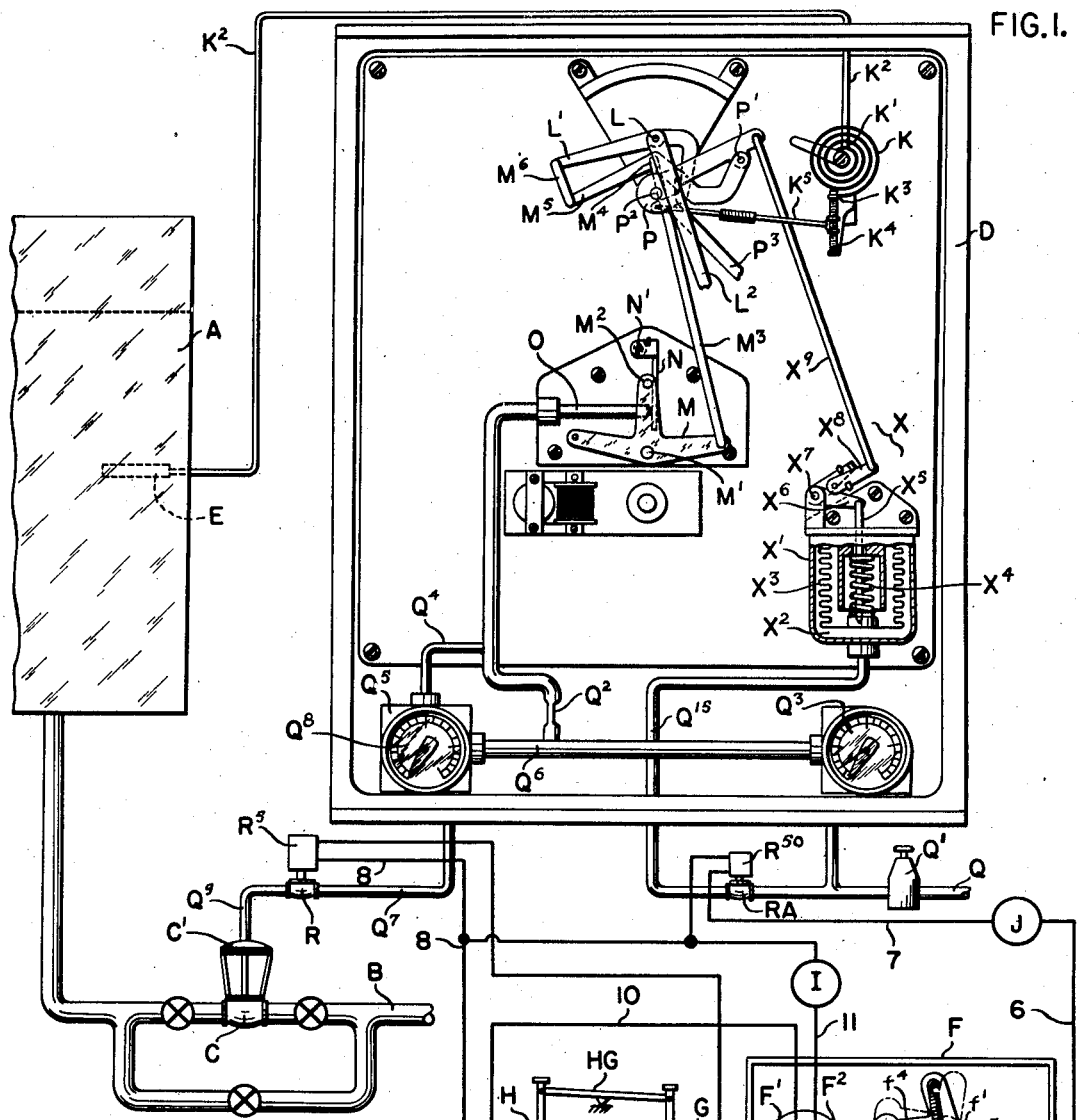
Fig. 1 is a diagrammatic representation of a simple form of the invention.

In the simple form of the invention shown diagrammatically in Fig. 1, the size is cooked in a cooker or cooking vessel A, of conventional type, which is heated by steam supplied by a pipe B at a rate determined by the adjustment of an automatic control valve C. The latter is adjusted during the cooking operation as required to maintain a suitable predetermined cooking temperature, which may be about 208° F., by a control instrument D which cooperates with a thermometer bulb E in the cooker A to continually measure and record the size temperature. Advantageously, and as shown, the instrument D is a recording thermometer of well known commercial type which includes air control provisions for effecting an "on and off" control of the valve C. In the form of the invention shown in Fig. 1, the cooking operation proper, is terminated after a cooking period of predetermined extent by a cooking timer F, which includes a timing motor F', a timing switch $f$, and cooperating parts hereinafter described.

As diagrammatically shown in Fig. 1, the steam supply valve is opened to initiate the cooking operation and the timer F is started into operation by the closure of a push button switch G. At the termination of the cooking period, the timer F, which operates continuously during the cooking operation, terminates its own operation and at the same time adjusts the control instrument D, so that the latter will then operate to maintain the lower storage temperature of 170° or so. A second push button switch H is mechanically interlocked by a lever HG with the starting switch G so that the closure of either opens the other. The switch is actuated at the conclusion of each cooking operation to close the valve C and to reset the timing mechanism F in a manner hereinafter described, preparatory to the initiation of a subsequent size cooking operation.

The essential elements of the thermometer D are diagrammatically illustrated in Fig. 1. As there shown, those elements comprise a spiral Bourdon tube K, to the stationary end K' of which a pressure proportional to the temperature of the size in the cooker A, is transmitted from the thermometer bulb E through a pipe or capillary tube $K^2$. The movable end $K^3$ of the Bourdon tube K is connected to an arm $K^4$ which oscillates about the axis of the spiral as the temperature in the bulb E varies. A link $K^5$ connected at one end to the arm $K^2$ at a point adjustable along the length of the latter, has its other end connected to a lever L' which is secured to, and gives angular motion to a pen shaft L which carries the recording pen arm $L^2$ of the instrument D.

The air control provisions of the instrument D as diagrammatically shown in Fig. 1, comprises a flapper or valve N pivoted at N', and adjusted by the oscillation of a lever M pivoted at M', toward and away from a position in which it engages and closes the vent orifice of a bleed nozzle O. The flapper N is biased for movement into engagement with the nozzle O and the lever M includes a flapper lifter pin $M^2$ which engages the flapper and moves it way from the nozzle O when the lever M is turned clockwise.

The means shown in Fig. 1 for angularly adjusting the valve M as the size temperature varies, comprises a link $M^3$ having its lower end connected to lever M and having its upper end connected by the pivot $M^4$ to a lever $M^5$ at a point intermediate the ends of the latter. One end of the lever $M^5$ is suspended by a link $M^6$ from one end of the lever L'. The second end of the lever $M^5$ is connected through a pivot P' to a control point adjusting lever P supported by a pivot $P^2$ and carrying the usual control point index arm $P^3$. As shown, the lever P is connected by a link $X^9$ to an actuating lever arm $X^8$ of a remote index adjusting device X which operates to vary the angular position of the lever P and thereby vary the position of the index arm $P^3$ and the elevation of the pivot P'. As will be apparent, the effect of raising or lowering the pivot P' is to respectively increase or decrease the size temperature required to effect sufficient counterclockwise movement of the arm $K^4$ to cause movement of the flapper N away from the nozzle O.

As shown in Fig. 1 air under pressure is supplied to the nozzle O by a supply pipe Q, including a pressure regulating valve Q', adjusted to maintain a suitable and approximately constant air pressure at the inlet side of a restricted orifice $Q^2$ interposed in the supply pipe Q between the pressure regulator Q' and the nozzle O. The pressure at the outlet of the regulator Q' is indicated by a pressure gauge $Q^3$. The nozzle pressure of the outlet side of the orifice $Q^2$ is transmitted by pipe or conduit $Q^4$ to a booster valve $Q^5$ which reduces the pressure of air received through the pipe $Q^6$ from a portion of the supply pipe Q between the regulator Q' and the restricted orifice $Q^2$ as required to maintain a control pressure in its outlet pipe $Q^7$ which is proportional to the nozzle pressure in the pipe $Q^4$. The booster valve $Q^5$ is advantageously of the well known commercial type used in "Brown" air controllers and one form of which is disclosed in the Moore Patent 2,125,081 and hence need not be further described or illustrated herein. The control pressure transmitted through the pipe $Q^7$ is indicated by a pressure gauge $Q^8$.

Whether the diaphragm chamber C' of the steam supply valve C is connected to the pipe $Q^7$ or to the atmosphere, depends upon whether the solenoid coil $R^5$ of a venting solenoid valve R is or is not energized. The valve R may well be of a commercial type. In the form shown by way of illustration in Fig. 2, it comprises a valve casing enclosing valve inlet and outlet chambers which are connected by a port R'. The valve casing is also formed with a port $R^2$ forming a vent from the outlet chamber of the valve, above and co-axial with the port R'. A vertically movable valve member $R^3$, is biased for down movement into the position in which it closes the port R' and opens the vent port $R^2$, and thereby prevents the transmission of the control pressure in pipe $Q^7$ to the diaphragm chamber C', and opens the latter to the atmosphere. The valve C is biased to close when the pressure in the chamber C' is reduced to or below the pressure maintained in the pipe $Q^7$ when the nozzle O is not throttled by the flapper N.

As diagrammatically shown, the valve member $R^3$ has its stem extending upwardly through the vent port $R^2$, and connected to the lower end of an armature core $R^4$ axially disposed in the solenoid coil $R^5$. The energization of the latter, effected as hereinafter described, raises the valve member $R^3$ to the position in which it closes the vent port $R^2$ and opens the port R', and thus permits the control pressure to be transmitted through the inlet and outlet chambers of valve R, and through the pipe $Q^9$ to the diaphragm chamber C', so that valve C will open if the size temperature is then low enough to permit the flapper M to throttle the bleed nozzle O.

The timer F may be of any one of various known types. As diagrammatically illustrated by way of example in Fig. 1, the timer F comprises an electric motor F' adapted to slowly rotate a shaft $F^2$ through speed reducing gearing not shown. A switch actuating arm $F^3$ is normally clutched to the shaft $F^2$ for counterclockwise movement by the motor F' between an initial position shown in full lines and a dotted line switch actuating position. In its initial full line position, the arm $F^3$ engages a stop pin $F^4$ adjustably secured in a slot $F^5$ extending circularly about the shaft $F^2$. The adjustment of the pin $F^4$ along the slot $F^5$ varies the duration of the cooking operation by varying the angular distance between the full line and dotted line positions of the arm $F^3$. The arm $F^3$ may be unclutched from the shaft $F^2$ by the energization of an electromagnet $F^6$. The latter is energized, as hereinafter described, after the arm $F^3$ has been moved into its dotted line position, and the arm $F^3$ is then free to fall back into the full line position under action of gravity, and thus reset the timer preparatory to a subsequent cooking operation.

During the final portion of the movement of the arm $F^3$ into its dotted line position, it actuates the timer switch member $f$. As diagrammatically shown, the switch member F is L shaped comprising an uprising arm connected at its upper end to and suspended from a pivot $f'$, and comprising a second arm extending horizontally away from one side of the lower end of the uprising arm. Adjacent its free end, the horizontal arm carries at its under side bridging contact member $f^2$. The switch member $f$ is adjusted between its full and dotted line positions shown in Fig. 1 by actuating means comprising a bell crank lever $f^4$ journaled on the pivot $f'$ and having an uprising arm to the upper end of which one end of a snap action spring $f^3$ is connected to the switch member at a point some distance below the pivot pin $f'$. As the bell crank is oscillated between its full and dotted line positions shown in Fig. 1, the line of action of the spring passes from one side to the other of the axis of the pivot. In consequence the spring $f^3$ holds the switch member $f$ in its full line, closed position when the lever $f^4$ is in its full line position, and when the lever $f^4$ is in dotted line position, the spring $f^3$ holds the switch member $f$ in its dotted line, open position.

As the arm $F^3$ approaches its dotted line position, it engages the horizontal arm of the bell crank $f^4$ and moves the latter from its full line into its dotted line position, and thus adjusts the switch member $f$ into its open position. When thereafter the electro-magnetic clutch releasing member $F^6$ is energized and the arm $F^3$ drops back into its full line position, the bell crank $f^4$ returns under the action of gravity or other biasing force to its full line position, and thus returns the switch member $f$ to its full line, closed position. The remote index setting device X through which the timer F adjusts the instrument D to terminate the cooking operation and to initiate the hot storage operation comprises a casing X' enclosing a chamber $X^2$ which is closed except for a central opening in its upper end wall. A bellows element $X^3$ is located in the casing X' and has a closed and movable lower end, and has its upper end open and connected to the top wall of the casing X', at the margin of the central opening therein. During the cooking operation, the space in the chamber $X^2$ external to bellows $X^3$ is connected to the air supply pipe Q at the outlet side of the pressure regulator Q' by a branch pipe $Q^{15}$. The pressure in the chamber $X^2$ contracts the bellows $X^3$ until the force exerted by said pressure is neutralized by resiliency of the bellows and of a spring $X^4$ which acts between the bottom end wall of the bellows $X^3$ and the upper portion of the casing X'.

The bottom wall of the bellows $X^3$ is connected by a rod $X^5$ to an arm $X^6$ secured to a rock shaft $X^7$ journaled in an upper end portion of the casing X'. A second arm $X^8$ normally secured to and turning with the shaft $X^7$, and angularly adjustable about the latter, is connected by a link $X^9$ to the control point adjusting lever P of the instrument D.

During the size cooking operation, the full pressure at the outlet side of the regulator Q' is transmitted by the pipe $Q^{15}$ to the chamber $X^2$, through a second venting solenoid valve RA, which may be, and as shown is, identical with the valve R, and which has its solenoid winding $R^{50}$ included in the energizing circuit of the timer F. In consequence, the size cooking temperature which the instrument D maintains depends upon the mechanical linkage, including the parts $X^5$, $X^6$, $X^7$, $X^8$ and $X^9$, between the control point adjusting lever P and the bottom wall of the bellows $X^3$, and may be varied by varying the effective length of that linkage. At the end of the cooking period the timer F deenergizes the valve RA, but not the valve R. On the de-energization of the valve RA, the chamber $X^2$ is opened to the atmosphere by the valve and the bellows $X^3$ expands. This gives a clockwise adjustment to the lever P and the instrument DA then tends to maintain a storage size temperature lower than the previous size cooking temperature. That storage temperature depends upon the effective length of the linkage between the lever P and the bottom wall of the expanded bellows $X^3$, and may be adjusted by varying the effective length of said linkage.

With the timer F of Fig. 1 in the condition shown in full lines in Fig. 1, and with a batch or charge of cold size in the cooking vessel A, the size cooking operation may be initiated by depressing the push button control switch G. The closure of that switch energizes the solenoid $R^5$ of the solenoid vent valve R, so that the instrument D may transmit its control pressure to the device chamber C' of the valve C. The closure of the push button G also energizes both the solenoid $R^{50}$ of the valve RA and the timing motor F' and starts the latter into operation. Current for thus energizing the solenoid $R^{50}$ and the motor F' is supplied by supply conductors 1 and 2.

On the closure of the switch G, a branch conductor 3 from the supply conductor 1 is connected by said switch and a conductor 4 to one terminal of the winding $R^5$ of valve R. The second terminal of that winding is connected by return wiring 8 to the supply conductor 2. On the closure of the switch G, the conductor 3 is also connected through conductor 4 to one terminal of the motor F'. The second terminal of motor F' is connected by a conductor 5, the bridging contact $f^2$ of the switch f and a conductor 6 to one terminal of an indicating device J, which may be a signal lamp, and which has its other terminal connected by a conductor 7 to one terminal of the solenoid winding $R^5$ of the valve RA. The second terminal of that winding is connected by a conductor 8 to the supply conductor 2.

During each cooking operation of the apparatus shown in Fig. 1, the solenoids $R^5$ and $R^{50}$ are thus continuously energized and each of the valves R and RA is continuously open. The control pressure then transmitted from the instrument D to the chamber C' of the valve C through the pipe $Q^7$, valve R and pipe $Q^9$ keeps the valve C wide open when the size temperature does not exceed the predetermined cooking temperature. When the size temperature exceeds said predetermined temperature, the instrument D reduces the pressure in the chamber C', and thereby permits the valve C to close.

After the cooking operation has continued for the predetermined time fixed by the adjustment of the stop pin $F^4$ in the slot $F^5$, the arm $F^3$ of the cooking timer F engages the switch actuating lever $f^4$ and turns the latter from its full line position into its dotted line position. This change in position of the lever $f^4$ moves the snap action spring $f^3$ transversely across the axis of the pivot $f'$ and snaps the switch member f into its open position. This moves the bridging contact $f^2$ out of engagement with the switch contacts to which the conductors 4 and 5 are connected and thereby de-energizes the motor F', the device J, and the winding $R^{50}$ of the venting solenoid valve RA. This permits the valve member $R^3$ of the valve RA to move downward and close the valve port R' while opening the port $R^2$ and thereby the chamber $X^2$ to the atmosphere, whereupon the bellows $X^3$ expands and operates through lever $X^8$ and link $X^9$ to reduce the size temperature which the instrument D tends to maintain from the cooking temperature of 208° or so, to the storage temperature of 170° or so. This immediately closes the steam valve C and terminates the size cooking operation initiated when the switch G of Fig. 1 was last previously closed. Following the closure of the valve C, the size slowly cools, as a result of radiation and other heat losses, until the size temperature is lower than the predetermined storage temperature, whereupon the instrument D opens the steam valve C and thereafter said instrument D closes and opens said valve as required to maintain the size at approximately the predetermined storage temperature.

The closure of the push button switch member H closes the energizing circuit of the element $F^6$ which permits the arm $F^3$ to return to its full line position and thus rests the timer F for a subsequent size cooking operation. The energizing circuit closed by the switch H comprises the branch 9 of supply conductor 1, the electro-magnetic resetting device $F^6$, a conductor 11, an indicator I, which may be a signal light, and the return wiring 8 connected to the supply conductor 2. The closure of the switch H thus not only resets the timer F of Fig. 1, but also energizes the indicator I, which then indicates that the apparatus is in condition to begin cooking a fresh batch of cool size, which may be placed in the cooker A after the removal of the previously cooked charge.

As previously stated, in cooking thick boiling starch, it is necessary, or at least desirable, in heating up the starch to arrest the temperature rise for fifteen minutes or so, on the attainment of a size temperature of about 180° F., to give time for enzymes to work on the starch. At the end of that period the temperature of the starch should be raised to full cooking temperature, which ordinarily is about 208° F.

Figure 2:
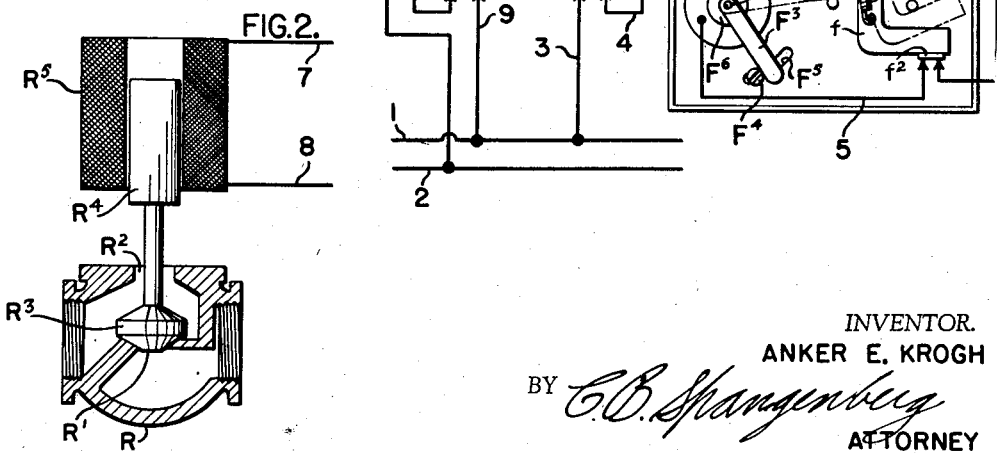
Fig. 2 is a sectional elevation of a control valve shown in Fig. 1.

In Fig. 3 I have diagrammatically illustrated how the apparatus shown in Figs. 1 and 2 may be used in conjunction with a second, or delayed rise timer FA, an electro-magnetic switch S, a second and very simple thermometric device T, and a second thermometer bulb TE, to maintain the size at the enzyme action temperature of 180° F. or so, for a suitable period. As diagrammatically shown in Fig. 3, the delayed rise timer FA may be a duplicate of the timer F shown in Fig. 1, except that ordinarily the reducing gear (not shown) between the motor F' and the switch actuator arm $F^3$ of the timer FA should be arranged to give a more rapid angular movement to the arm $F^3$ of the timer FA than is given to the arm $F^3$ of the timer F.

As hereinafter explained, the timer FA and electro-magnetic switch S are both energized by the thermometric device T, which may well be of simple commercial type commonly called a "blind" temperature controller, as it need include no temperature exhibiting provisions. As diagrammatically shown in Fig. 3, the device T comprises a snap action switch t and a bellows element T', which is contracted to close the switch t by pressure transmitted by the thermometer bulb TE, when the size heats up to the enzyme action temperature. Said pressure is transmitted from the bulb TE through a pipe TE' to the chamber $T^2$ in the casing body $T^3$ of the device T. The bellows T' is located within the chamber $T^2$ and has a closed vertically movable, lower end, and has its upper end open and secured to the annular top wall of the casing $T^3$ surrounding a central opening in said wall. The contraction of the bellows T' by the pressure in the chamber $T^2$ is opposed and regulated by a spring $T^4$.

A bellows rod or strut $T^5$ acts between the lower end of the bellows T' and a bell crank lever $t^4$ journaled on a horizontal pivot $t'$ carried by the casing $T^3$. The switch t is similar in shape to the previously described switch f, and is journaled on the pivot $t'$, and is connected to the lever $t^4$ by a spring $t^3$. The latter is moved past the axis of the pivot $t'$ as the size heats up to the enzyme action temperature of 180° or so, with the result that the switch t is then given a closing adjustment. While the parts t and $t^4$ are similar in shape and in their coaction to the previously described timer switch parts f and $f^4$, the vertical portions of the parts t and $t^4$ extend upwardly and downwardly, respectively, from the pivot $t'$, and the horizontal arm of the switch t carries a bridging contact $t^2$ at its upper side, so that it is moved upward on the closing adjustment of the switch t.

The closing adjustment of the switch t energizes the timing motor F' of the delayed rise timer FA, and energizes the electro-magnetic switch S and thereby deenergizes the motor F' of the timer F, and temporarily terminates the control of the steam supply valve C by the instrument D by deenergizing the coil R⁵ of the valve R. When the motor F' of the timer FA acts through its arm F³ to open the associated switch f, the motor and the electro-magnetic switch S are each deenergized. The deenergization of switch S permits the solenoid coil R⁵ of the valve R to be reenergized and thereby again subjects the steam supply valve C to control by the instrument D. The timer FA, solenoid coil R⁵, switch S and device T are operatively connected by electric circuit connections, for coaction as described.

Those connections comprise a branch conductor 13 from the supply conductor 1, connected by the bridging contact f² of the timer FA to a conductor 14 when said bridging contact is in its closed position. The conductor 14 extends to one energizing terminal of the motor F' of the timer FA. The other terminal of said motor is connected by a conductor 15 to one terminal of the winding of the electro-magnetic switch S. The latter has its second terminal connected by a conductor 16 to one of the two stationary contacts engaged by the bridging contact t² of the device T when the last mentioned contact is adjusted into its closed position. The other of said stationary contacts is connected by a conductor 17 and conductor 8 to the supply conductor 2.

The energization of the electro-magnetic switch S breaks the connection between the conductors 7A and 7B established by the switch S when the latter is deenergized. In Fig. 3 the conductors 7A and 7B and switch S replace the conductor 4 of Fig. 1, in the energizing circuit of the solenoid coil R⁵ of valve R. In consequence, the energization of the switch S closes the valve R and thus interrupts the supply of steam to the cooker A. In Fig. 3, the electro-magnetic resetting device F⁶ of the timer FA is connected in series with the device F⁶ of the timer F, and with the signal light I, the conductor 12 connecting the light I to one terminal of the device F⁶ of timer FA, and the second terminal of that device being connected by a conductor 12A to supply conductor 2.

In Fig. 3 the energization of the valve R is controlled jointly by the push button switch G and electro-magnetic switch S, and is independent of the operation of the timer F though subject to de-energization for enzyme action purpose through the switch S by the timer FA. In Fig. 3, the timer F directly terminates the cooking period, but does this by de-energizing the venting solenoid valve RA, which has its solenoid winding connected in an energizing circuit including the conductor 6 which extends from the timing switch f of the timer F to one terminal of the signal light J, the conductor 18 which connects the second terminal of the signal light J to one terminal of the winding of the valve RA, and a conductor 19 which connects the second terminal of said winding to conductor 12A and thereby to the supply conductor 2. In the contemplated use of the apparatus shown in Fig. 3, a cooking operation is initiated by closing the switch G. This energizes the motor of the timing device F, and the windings of the valves R and RA, and thereby opens each of those valves. With the low size temperature then prevailing, the full air pressure will be transmitted from the instrument D to the chamber C' of the valve C, and the latter will then be in its wide open position.

When thereafter the size temperature builds up to its predetermined enzyme action temperature of 180° or so, the switch t of the device T is actuated to connect the conductors 16 and 17, and thus energizes the electro-magnetic switch S and the timing motor F' of the timing device FA. The energization of the switch S disconnects the conductors 7A and 7B and thereby deenergizes the timing motor F' of the timing device F and deenergizes and closes each of the electro-magnetic valves R and RA. When the operation of the timing motor F' of device F is thus interrupted, its switch actuating lever F³ will occupy a position intermediate its starting and switch actuating positions. The closure of the valve R closes fuel valve C and cuts off the supply of fuel to the cooker, and thus the closure of the valve RA, when the switch S is energized, is without functional significance.

The interruption of the heat supply to the cooker, effected by the energization of the switch S, continues for a suitable enzyme action period of 15 minutes or so, required for the timer FA to open its switch f and thus open the energizing circuit for the switch S and motor F' of the timer FA. The resultant deenergization of the switch S reconnects the conductors 7A and 7B and thereby reenergizes the timer F and the windings R⁵ and R⁵⁰ of valves R and RA, and both of those valves remain open thereafter until the size cooking operation is terminated by the timer F when its arm F³ reaches its switch actuating position and opens the energizing circuit for the timer F and solenoid R⁵⁰ of valve RA.

Ordinarily, there will be a considerable time interval between the initial attainment by the size of its full cooking temperature and the termination of the cooking operation by the timer F, and during that interval the air control provisions of the instrument D will open and close the fuel valve C as required to prevent the size temperature from varying significantly in either direction from the predetermined full cooking temperatures.

While the deenergization of the energizing circuit of the timer F at the end of the cooking operation closes the valve RA, it leaves the valve R open and so long as the switch G remains closed, the air control provisions of the instrument D open and close the valve C as required to maintain the size at the storage temperature of 170° or so, as in the arrangement shown in Fig. 1.

While in Fig. 3 the timer F directly terminates the cooking operation, the duration of the cooking period is determined jointly by the timers F and FA, and is equal to the sum of the time periods required for the movements of the arms F³ of the two timers F and FA from their respective initial positions to their respective switch actuating positions.

It is theoretically possible, of course, to use a single timer of the known type including a time program cam and associated switch means, to do what is done collectively by the timers F and FA of Fig. 3. However, the use of the two timers F and FA has the practical advantage that those timers which may be duplicates of one another, may be a very simple and easily adjustable type so that the timing action of each may be varied quickly and easily as conditions made desirable.

While in accordance with the provisions of the statutes, I have illustrated and described the best forms of embodiment of my invention now known to me, it will be apparent to those skilled in the art that changes may be made in the form of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent is:

1. The combination with a size cooker and hot storage device comprising a size chamber, of an air actuated valve regulating the supply of heat to the chamber, a thermometer responsive to the temperature of the size in said chamber and including air control means normally operative to close and open said valve as the size temperature rises above and falls below a predetermined cooking temperature, and timing means operating after a cooking period of predetermined duration to adjust said thermometer into a condition in which it is operative to close and open said valve as the size temperature rises above and falls below a predetermined storage temperature lower than said cooking temperature during a hot storage period of indefinite duration and means operable independent of said timing means to interrupt the supply of heat to said chamber and thereby terminate such hot storage period, and to simultaneously reset said timing means preparatory to the initiation of a subsequent cooking period.

2. The combination with a size cooker and hot storage device comprising a size chamber, of an air actuated valve regulating the supply of heat to the chamber, a thermometer responsive to the temperature of the size in the chamber and including an air control means normally operative to close and open said valve as size temperature rises above and falls below a predetermined temperature, adjusting means in said thermometer operative to adjust the temperature at which said size is maintained to a different predetermined point, and timing means operated after a cooking period of predetermined duration to operate said adjusting means to lower the temperature at which said size will be maintained and thereby initiate a hot storage period of indefinite duration, and means operable independently of said heating means to interrupt the supply of heat to said chamber and thereby terminate such hot storage period, and to simultaneously reset said timing means preparatory to the initiation of a subsequent cooking period.

3. The combination with a size cooker, of a regulator controlling the supply of heat to the cooker, thermometric means responsive to the temperature of the size in the cooker and normally controlling said regulator and adjusting the latter as required to maintain a predetermined size cooking temperature, other thermometric means responsive to the temperature of the size in the cooker and operated on the attainment of a predetermined size temperature lower than the said cooking temperature to interrupt the control of said regulator by the first mentioned means and to adjust said regulator to cut off the supply of heat to the cooker, timing means restoring the control of the first mentioned thermometric means over the regulator at the end of a predetermined period following said temperature attainment and terminating the cooking operation after a predetermined duration thereof, and means forming part of said first thermometric means operative upon completion of the cooking period to maintain the size at a predetermined lower temperature.

4. The combination with a size cooker, of an air actuated valve regulating the supply of heat to the cooker, a thermometer having an adjustable control point responsive to the temperature of the size in said cooker and including an air control means normally operative to close and open said valve as the size temperature rises above and falls below a predetermined temperature, a timing device, means for starting said device into operation at the beginning of a cooking operation, means actuated by said device after a predetermined extent of operation of the latter to adjust the control point of the thermometer to a storage temperature lower than said predetermined temperature, means responsive to the temperature of the size in the cooker and actuated on an attainment of a predetermined temperature lower than the first mentioned temperature to interrupt the operation of said timing device for a predetermined period of time and to simultaneously render said thermometer inoperative to open said valve and to effect the closure of the latter for an interval shorter than the period of operation of said timing device.

5. The combination with a size cooker, of an air actuated valve regulating the supply of heat to the cooker, a thermometer responsive to the temperature of the size in said cooker and including air control means normally operative to close and open the valve as the size temperature rises above and falls below a predetermined temperature, a timing device means for starting said device into operation at the beginning of a cooking operation, means actuated by said device after a predetermined operation of the latter to reduce the temperature at which said thermometer tends to maintain said size, means responsive to the temperature of the size in the cooker and rendered operative on the attainment of a predetermined temperature lower than the first mentioned temperature to interrupt the operation of said timing device and to simultaneously render said thermometer inoperative to open said valve and to effect closure of the latter, and a second timing device rendering said last mentioned means inoperative at the end of a predetermined period of time following said temperature attainment.

6. The combination with a size cooker and hot storage device comprising a size chamber, an air actuated valve to regulate the supply of heat to the chamber, a thermometer responsive to the temperature of the size in the chamber and including air control means normally operative to close and open said valve as the size temperature rises above or falls below a predetermined temperature, air operated means forming part of said thermometer and operative when supplied with air to maintain the size at said predetermined temperature and when the supply of air is cut off to maintain said size at a lower predetermined temperature, a supply of air under pressure for said air operated means, valve means controlling said supply of air, a timing device, means for starting said device in operation at the beginning of a cooking operation, and means operated after a predetermined extent of operation of the latter to actuate said valve means and cut off the supply of air to said air operated means whereby the air operated means will act to maintain the size at said lower predetermined temperature.

ANKER E. KROGH.